United States Patent [19]

Hiraiwa

[11] Patent Number: 4,693,334
[45] Date of Patent: Sep. 15, 1987

[54] FOUR WHEEL DRIVE SYSTEM

[75] Inventor: Kazuyoshi Hiraiwa, Atsugi, Japan

[73] Assignee: Nissan Motor Co., Ltd., Yokohama, Japan

[21] Appl. No.: 848,490

[22] Filed: Apr. 7, 1986

[30] Foreign Application Priority Data

Apr. 9, 1985 [JP] Japan .................................. 60-73517

[51] Int. Cl.[4] ............................................. B60K 17/34
[52] U.S. Cl. .................................................. 180/249
[58] Field of Search ............... 180/250, 249, 248, 247; 74/711, 710.5, 714, 701

[56] References Cited

U.S. PATENT DOCUMENTS 4,381,828 5/1983 Lunn et al. ......................... 180/247
4,441,575 4/1984 Suzuki ............................... 180/250 X

FOREIGN PATENT DOCUMENTS 3116411 3/1982 Fed. Rep. of Germany .
3217275 11/1982 Fed. Rep. of Germany .
58-63523 4/1983 Japan .................................. 180/249
60-18656 1/1985 Japan .

Primary Examiner—John A. Pekar
Attorney, Agent, or Firm—Schwartz, Jeffery, Schwaab, Mack, Blumenthal & Evans

[57] ABSTRACT

In a four wheel drive system, a final reduction gearing and a front differential for a pair of left and right front road wheels are disposed within a transaxle casing while a planetary gear type center differential, a speed-up mechanism and a direction changing mechanism are disposed within a transfer case.

6 Claims, 3 Drawing Figures

FOUR WHEEL DRIVE SYSTEM

BACKGROUND OF THE INVENTION

1. Field of the Invention

The present invention relates to a four wheel drive system, particularly for a transverse engine layout.

2. Description of the Prior Art

An example of this kind four wheel drive system is disclosed in Japanese Provisional Patent Publication No. 58-63523. In this four wheel drive system, a final reduction gearing and a center differential are accommodated within a transaxle case while a front differential for front road wheels is accommodated within a supplementary case attached to the transaxle case on the same side thereof where an engine is attached to. By this, it is intended to utilize constituent parts of a two wheel drive system as many as possible for attaining a four wheel drive system having a center differential.

However, since the center differential is adapted to be installed within the transaxle case in place of the front differential, the space for arrangement thereof is limited, resulting in design restrictions of the center differential as for example a problem that a viscous clutch cannot be installed in the limited space.

SUMMARY OF THE INVENTION

In accordance with the present invention, there is provided a novel and improved four wheel drive system which comprises a transverse engine having a crankshaft, a transaxle case having a side where it is attached to the engine, a transfer case attached to the transaxle case on the above mentioned side thereof, a speed change mechanism disposed within the transaxle case and having an input shaft in axial alignment with the crankshaft and an output shaft in parallel with the input shaft, a final reduction gearing disposed within the transaxle case and having an input portion drivingly connected to the output shaft of the speed change mechanism and an output portion, a planetary gear type center differential disposed within the transfer case and having an internal gear, a sun gear, a plurality of pinion gears meshing with the internal gear and the sun gear and a pinion carrier rotatably carrying thereon the pinion gears, a viscous clutch disposed between the internal gear and the sun gear, a first hollow shaft interconnecting the output portion of the final reduction gear and the pinion carrier of the center differential, a terminal differential for a pair of left and right road wheels, a second hollow shaft passing through the first hollow shaft to interconnect one of the internal gear and the sun gear and the terminal differential, a speed-up mechanism having an input portion connected to the other of the internal gear and the sun gear and an output portion, a propeller shaft elongated in the direction intersecting the crankshaft at right angles, and a direction changing mechanism disposed within the transfer case and interconnecting the output portion of the speed-up mechanism and an end of the propeller shaft.

The above structure is quite effective for overcoming the above noted disadvantages and shortcoming inherent in the prior art devices.

It is accordingly an object of the present invention to provide a novel and improved four wheel drive system which can eliminate or at least alleviate design restriction particularly on a center differential.

It is another object of the present invention to provide a novel and improved four wheel drive system of the above described character which can employ a viscous clutch as means for controlling operation of the center differential.

It is a further object of the present invention to provide a novel and improved four wheel drive system of the above described character which can effect a smooth four wheel drive at all times.

It is a yet further object of the present invention to provide a novel and improved four wheel drive system of the above described character which can be attained by utilizing so many constituent parts of a transaxle for a two wheel drive for a transverse engine layout.

BRIEF DESCRIPTION OF THE DRAWINGS

The features and advantages of the four wheel drive system of the present invention will become more clearly appreciated from the following description taken in conjunction with the accompanying drawings, in which.

DETAILED DESCRIPTION OF THE PREFERRED EMBODIMENTS

Figure 1:
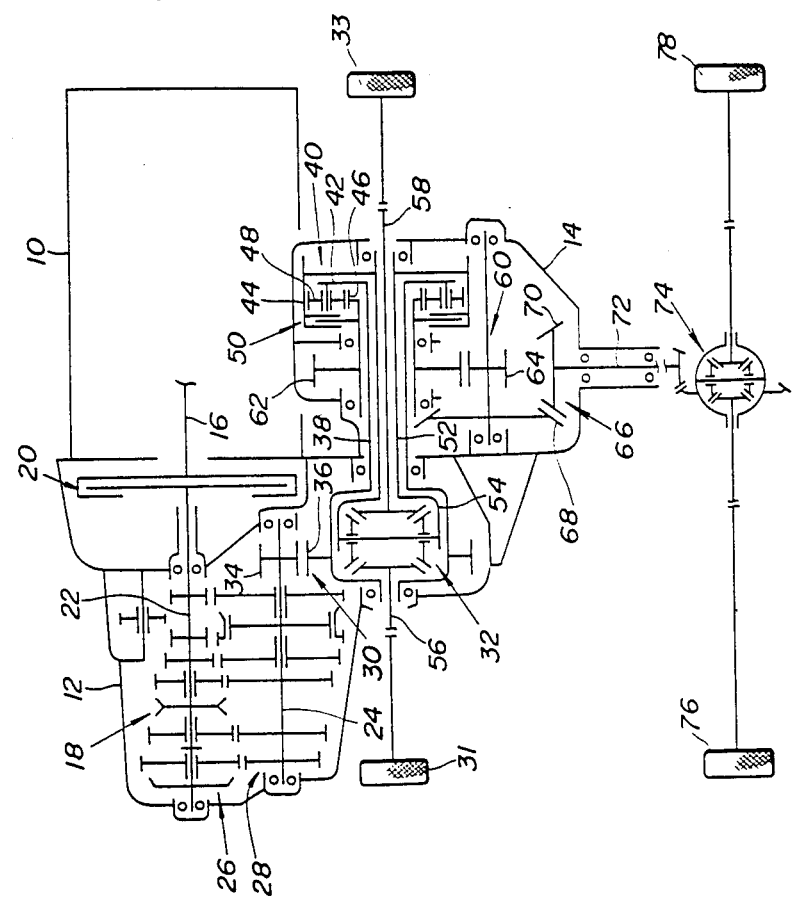
FIG. 1 is a diagrammatic view of a four wheel drive system of the present invention.
Figure 2:
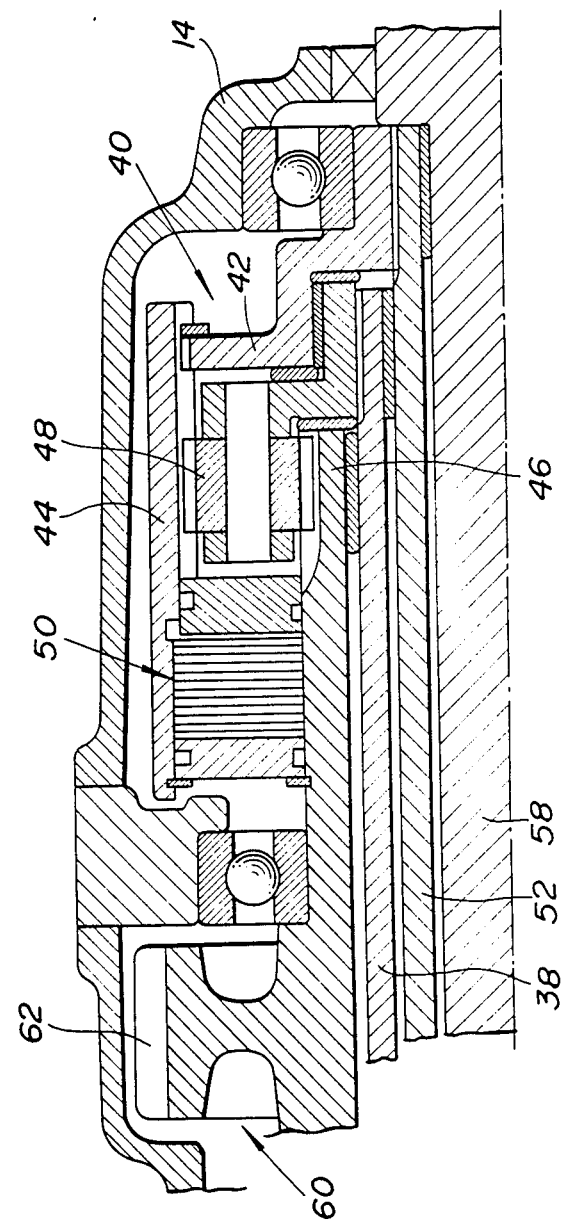
FIG. 2 is an enlarged fragmentary sectional view of a center differential and its associated parts of the four wheel drive system of FIG. 1.

Referring to FIGS. 1 and 2, a four wheel drive system is shown as being of the type for use in a front-engine front-drive vehicle. An engine 10 is connected with a transaxle case 12 in line therewith. A transfer case 14 is attached to the transaxle case 12 on the same side thereof where the engine 10 is attached to. A crankshaft 16 of the engine 10 is arranged to elongate in the direction intersecting a front-to-rear direction of a vehicle, i.e., the engine 10 is transversely installed. The crankshaft 16 is connected to a speed change mechanism 18 disposed within the transaxl case 12. The speed change mechanism 18 includes a clutch 20, a mainshaft or input shaft 22 in axial alignment with the crankshaft 16, a counter shaft or output shaft 24 in parallel with the input shaft 22, a first group of gears 26 installed on the input shaft 22, a second group of gears 28 installed on the output shaft 24, etc. Within the transaxle case 12 there are disposed a final reduction gearing 30 and a terminal or front differential 32 for a pair of left and right front road wheels 31, 33. The final reduction gearing 30 includes a smaller diameter gear 34 installed on the output shaft 24 and a larger diameter gear 36 in mesh therewith. The gear 36 is connected via a first hollow shaft 38 to a pinion carrier 42 which functions as an input portion of a center differential 40 disposed within the transfer case 14. The center differential 40 is of the planetary gear type and includes an internal gear 44 (first output portion), a sun gear 46 (second output portion), the above described pinion carrier 42 and a plurality of pinion gears 48 rotatably carried by the pinion carrier 42 and meshing with both of the internal gear 44 and the sun gear 46. A viscous coupling or clutch 50 is disposed between the internal gear 44 and the sun gear 46 and capable of drivingly interconnecting the same. The internal gear 44 is connected, via a second hollow shaft 52 passing through the first hollow shaft 38, to a differential case 54 of the front differential 32. From the front differential 32 there project drive axles 56, 58 for driving the front road wheels 31, 32, respectively. The drive axle 58 extends through the second hollow shaft 52. The sun gear 46 of the center differential 40 is connected to a larger diameter gear 62 of a speed-up mechanism 60. The speed-up mechanism 60 includes the larger diameter gear 62 and a smaller diameter 64. The smaller diameter gear 64 which functions as an output portion of the speed-up mechanism 60 is connected to a bevel gear 68 of a direction changing mechanism 66. The direction changing mechanism 66 includes the bevel gear 68 and a bevel gear 70 meshing therewith in such a manner that the axes of the both intersect at right angles. The bevel gear 70 is connected to a propeller shaft 72.

In operation, engine power is transmitted from the crankshaft 16 of the engine 10 to the output shaft 24 through a selected gear train of the first and second groups of gears 26, 28. The output speed of the output shaft 24 is then reduced by the final reduction gearing 30, i.e., by the gear 34 and the gear 36 and thereafter is supplied to the pinion carrier 42 of the center differential 40 via the first hollow shaft 38. The center differential 40, when the difference in speed between the front and rear road wheels is small and the torque transmitted through the viscous clutch 50 is small, effects a differential action based on the difference in load between the front road wheels and the rear road wheels, thereby causing the internal gear 44 and the sun gear 46 to rotate at certain speeds. Output of the intrnal gear 44 is transmitted through the second hollow shaft 52 to the differential gear case 54 and therefrom transmitted to the drive axles 56, 58 under control of a differential action effected by the front differential 32. On the other hand, output of the sun gear 46 is transmitted to the larger diameter gear 62 to be increased in speed by the speed-up mechanism 60 and thereafter is changed in the transmission direction by the direction changing mechanism 66 to be transmitted to the gear 70. Engine power is transmitted from the propeller shaft 72 to a second terminal of rear differential 74 for a pair of left and right rear road wheels 76, 78, whereby to drive the rear road wheels 76, 78. As described above, when the difference in speed between the front and rear road wheels is small as in normal driving, the center differential 40 controls distribution of a power based on the difference in load between the front and rear road wheels, whereby to make it possible to attain a smooth four wheel drive at all times.

On the other hand, when the front or rear road wheels loose traction on a slippery road to increase the difference in speed between the front and rear road wheels, the torque transmitted by the viscous clutch 50 increases to limit the differential action by the center differential 40, thereby to prevent the engine power supplied to the road wheels with traction from reducing. This is therefore suited for off-road travelling, driving out from a muddy place, etc.

In the meantime, while this embodiment has been described and shown as to the four wheel drive system for use in a front-engine front-drive vehicle, the present invention can otherwise be applied to a four wheel drive system for use in a midship car. Further, while the speed change mechanism 18 is shown as a manual type, it can otherwise be of the automatic type.

Figure 3:
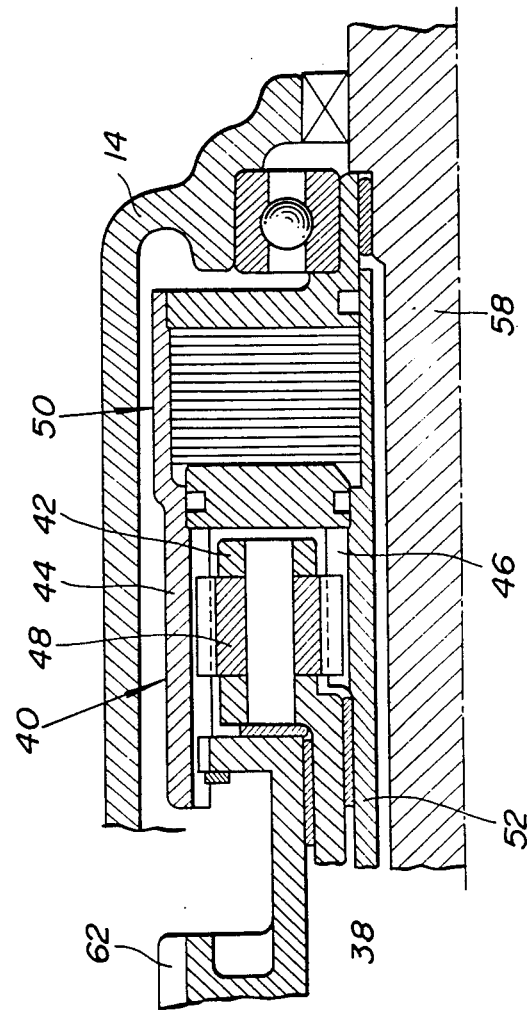
FIG. 3 is a view similar to FIG. 2 but showing a modification of the present invention.

FIG. 3 shows a modified embodiment which differs from the previous embodiment in that the center differential 40 is contructed and arranged so that the output of the sun gear 46 is transmitted to the front road wheels 31, 33 while the output of the internal gear 44 is transmitted to the rear road wheels, 76, 78, that is, distribution of engine power to the front and rear road wheels is reversed as compared with the previous embodiment of FIGS. 1 and 2. Except for the above, this embodiment is substantially similar to the previous embodiment and can produce substantially the same effects.

From the foregoing, it is to be understood that according to the present invention a final reduction gearing and a front differential are disposed within a transaxle case while a planetary type center differential, a speed-up mechanism and a direction changing mechanism are disposed within a transfer case, whereby design restrictions particularly on a center differential can be eliminated or at least alleviated to make it possible to employ a viscous clutch for controlling operation of the center differetial. Further, the four wheel drive system of the present invention can be variably designed to vary distribution of engine power from the center differential to front and rear road wheels.

It is to be understood that the present invention may be embodied in other specific forms without departing from the spirit or essential characteristics of the present invention. The preferred embodiments are therefore to be considered illustrative and not restrictive. The scope of the invention is indicated by the appended claims rather than by the foregoing descriptions and all changes or variations which fall within the meaning and range of the claims are therefore intended to be embraced therein.

What is claimed is:

1. A full-time four wheel drive system comprising:
    a transverse engine having a crankshaft;
    a transaxle case having a side where it is attached to said engine;
    a transfer case attached to said transaxle casing on said side thereof;
    a speed change mechanism disposed within said transaxle case and having an input shaft in axial alignment with said crankshaft and an output shaft in parallel with said input shaft;
    a final reduction gearing disposed within said transaxle case and having an input portion drivingly connected to said output shaft of said speed change mechanism and an output portion;
    a planetary gear type center differential disposed within said transfer case and having an internal gear, a sun gear, a plurality of pinion gears meshing with said internal gear and said sun gear and a pinion carrier rotatably carrying thereon said pinion gears;
    a viscous clutch interposed between said internal gear and said sun gear for controlling operation of said center differential;
    a first hollow shaft interconnecting said output portion of said final reduction gearing and said pinion carrier of said center differential;
    a terminal differential for a pair of left and right road wheels;
    a second hollow shaft passing through said first hollow shaft to interconnect one of said internal gear and said sun gear and said terminal differential;
    a speed-up mechanism disposed within said transfer case and having an input portion connected to the other of said internal gear and said sun gear and an output portion;
    a propeller shaft elongated in the direction intersecting said crankshaft at right angles; and a direction changing mechanism disposed within said transfer case and interconnecting said output portion of said speed-up mechanism and an end of said propeller shaft.

2. The full-time four wheel drive system as set forth in claim 1, wherein said terminal differential has a pair of drive axles drivingly connected to said road wheels, one of said drive axles extending through said second hollow shaft.

3. The full-time four wheel drive system as set forth in claim 2, further comprising a second terminal differential connected to the other end of said propeller shaft, said first terminal differential being a front differential for front road wheels and said second terminal differential being a rear differential for rear road wheels.

4. The full-time four wheel drive system as set forth in claim 1, wherein said terminal differential is a front differential for front road wheels, said front differential being located in said transaxle case, said viscous clutch being located in said transfer case, whereby installation and production of the drive system is facilitated.

5. The full-time four wheel drive system as claimed in claim 4, wherein said input portion of said speed-up mechanism includes a first gear axially spaced from said sun gear, said viscous clutch being located axially between said first gear and said sun gear.

6. The full-time four wheel drive system as claimed in claim 5, wherein said viscous clutch is generally radially coextensive with a radial distance defined by said sun gear and said internal gear.

* * * * *